United States Patent
Bok

(10) Patent No.: US 10,159,192 B2
(45) Date of Patent: Dec. 25, 2018

(54) TRANSITION CONE LINER FOR A FARM COMBINE

(71) Applicant: Cone Guard, LLC, Sherwood, OH (US)

(72) Inventor: Raymond L. Bok, Sherwood, OH (US)

(73) Assignee: Cone Guard, LLC, Sherwood, OH (US)

( * ) Notice: Subject to any disclaimer, the term of this patent is extended or adjusted under 35 U.S.C. 154(b) by 93 days.

(21) Appl. No.: 15/266,364

(22) Filed: Sep. 15, 2016

(65) Prior Publication Data

US 2017/0079212 A1   Mar. 23, 2017

Related U.S. Application Data

(60) Provisional application No. 62/219,723, filed on Sep. 17, 2015.

(51) Int. Cl.
| | | |
|---|---|---|
| *A01F 12/46* | (2006.01) | |
| *A01F 12/44* | (2006.01) | |
| *A01D 41/12* | (2006.01) | |

(52) U.S. Cl.
CPC .......... *A01F 12/46* (2013.01); *A01D 41/1208* (2013.01); *A01D 41/1243* (2013.01); *A01F 12/444* (2013.01); *A01F 12/446* (2013.01)

(58) Field of Classification Search
CPC .. A01F 7/06; A01F 12/10; A01F 12/24; A01F 12/26
USPC .......................................................... 460/70
See application file for complete search history.

(56) References Cited

U.S. PATENT DOCUMENTS

| | | | |
|---|---|---|---|
| 3,982,549 A | | 9/1976 | De Pauw et al. |
| 4,108,150 A | | 8/1978 | Shaver |
| 4,154,250 A | | 5/1979 | Stuber |
| 4,672,901 A | * | 6/1987 | Stine .................. A01C 5/04 111/101 |
| 4,964,502 A | * | 10/1990 | Buschbom ............ A01D 23/02 198/642 |
| 5,145,462 A | | 9/1992 | Tanis et al. |
| 6,129,629 A | * | 10/2000 | Dammann ............... A01F 7/06 460/67 |
| 6,325,714 B1 | | 12/2001 | Tanis et al. |

(Continued)

FOREIGN PATENT DOCUMENTS

JP    11032559 A * 2/1999 ............. A01F 12/00

OTHER PUBLICATIONS

AgTalk Thread, dated Apr. 7, 2015, pp. 1-5.

(Continued)

*Primary Examiner* — Arpad Fabian-Kovacs
(74) *Attorney, Agent, or Firm* — MacMillan, Sobanski & Todd, LLC

(57) ABSTRACT

A liner panel for a transition cone of a farm combine is provided. The liner panel is configured to absorb abrasive forces caused by crop cuttings moving across an inner surface of the transition cone. The liner panel includes an upper edge having a length. A lower edge is positioned opposite the upper edge and has a length that is smaller than the length of the upper edge. Opposing side edges are connected to the upper edge and lower edge. The upper edge, lower edge and opposing edges cooperate such that the liner panel has a tapered shape.

11 Claims, 5 Drawing Sheets

(56) References Cited

U.S. PATENT DOCUMENTS

| | | | |
|---|---|---|---|
| 6,517,431 B2* | 2/2003 | Schwersmann | A01F 7/06 460/16 |
| 6,602,130 B1* | 8/2003 | Manning | A01F 12/444 209/30 |
| 6,908,378 B2 | 6/2005 | Ricketts et al. | |
| 7,201,652 B2 | 4/2007 | Van De Sluis et al. | |
| 9,089,094 B1 | 7/2015 | Kile | |
| 9,456,548 B2 | 10/2016 | Stephenson et al. | |
| 9,807,937 B2* | 11/2017 | Flickinger | A01F 7/06 |
| 2002/0045469 A1* | 4/2002 | Schwersmann | A01F 7/06 460/70 |
| 2002/0144637 A1* | 10/2002 | Wendling | A01C 7/042 111/163 |
| 2005/0005784 A1* | 1/2005 | Hamilton | A23N 5/01 99/600 |
| 2006/0079307 A1 | 4/2006 | Van De Sluis et al. | |
| 2007/0026913 A1 | 2/2007 | Kuchar | |
| 2014/0020571 A1* | 1/2014 | Bajema | A23N 5/08 99/569 |
| 2014/0174049 A1* | 6/2014 | Ricketts | A01F 12/26 56/14.6 |
| 2015/0230406 A1 | 8/2015 | Stephenson et al. | |
| 2016/0316627 A1* | 11/2016 | Brockel | A01D 61/00 |
| 2017/0105350 A1* | 4/2017 | Ricketts | A01F 7/062 |

OTHER PUBLICATIONS

AgTalk Thread, dated Apr. 21, 2015, pp. 1-3.
Invoice Detail, Case IH 8230, Axial Installing Cone Insert, dated Mar. 17, 2015, p. 1.
Redline Equipment, Case IH 8120, Axial Remove and Install Invoice #512918, dated Jul. 31, 2015, p. 1.
Redline Equipment, Case IH 7230, Axial Remove and Install Invoice #513007, dated Aug. 25, 2015, pp. 1-2.
Schlemmer Brothers, Metalworks, Quote No. Q006952, dated Feb. 18, 2015, p. 1.

* cited by examiner

TRANSITION CONE LINER FOR A FARM COMBINE

RELATED APPLICATIONS

This application claims priority from pending U.S. Provisional Patent Application No. 62/219,723 filed Sep. 17, 2015, the disclosure of which is incorporated herein by reference in its entirety.

BACKGROUND

A combine is a mobile farm machine that cuts agricultural crops from a field. As the combine cuts the crops, the combine further threshes the crop cuttings, thereby separating grain from chaff and straw as the combine moves through the field. A typical combine includes a header that initially cuts the crops, which are subsequently moved up a feeder to a transition cone and into a rotor. At the rotor, the crop cuttings are threshed and separated from chaff and straw. The chaff and straw are released out the back of the combine and put back onto the field. The separated grain is moved through a cleaning system and put into a grain tank, to be unloaded into one or more vehicles and hauled away.

A combine can include a transition cone, positioned downstream from the header. The transition cone is configured to direct the crop cuttings toward the rotor. In many instances, the transition cone is a funnel-shaped structure that is located near the front portion of the rotor. As the crop cuttings move through the combine, the transition cone is frequently subjected to wear as the crop cuttings move across the inner surface of the transition cone and are moved to the rotor.

It would be advantageous if transition cones could be improved to make them more resistant to wear.

SUMMARY

The above objects as well as other objects not specifically enumerated are achieved by a liner panel for a transition cone of a farm combine. The liner panel is configured to absorb abrasive forces caused by crop cuttings moving across an inner surface of the transition cone. The liner panel includes an upper edge having a length. A lower edge is positioned opposite the upper edge and has a length that is smaller than the length of the upper edge. Opposing side edges are connected to the upper edge and lower edge. The upper edge, lower edge and opposing edges cooperate such that the liner panel has a tapered shape.

There is also provided a transition cone configured for use in a farm combine. The transition cone includes a circumferential sidewall having an inner surface. A plurality of liner panels are seated against the inner surface of the circumferential sidewall. The liner panels are configured to substantially absorb abrasive forces caused by crop cuttings moving across the inner surface of the transition cone. A plurality of vanes are seated against the plurality of liner panels. The plurality of vanes are configured to guide the crop cuttings in a downstream direction. The liner panels have a tapered shape.

There is also provided a method of using liner panels within a transition cone of a farm combine. The method includes the steps of removing any existing vanes from an inner surface of the transition cone, seating a plurality of liner panels against the inner surface of the transition cone, seating a plurality of vanes against exposed surfaces of the seated liner panels and fastening the liner panels and vanes to the transition cone.

Various objects and advantages of the transition cone liner will become apparent to those skilled in the art from the following detailed description, when read in light of the accompanying drawings.

DETAILED DESCRIPTION OF THE INVENTION

The transition cone liner will now be described with occasional reference to specific embodiments. The transition cone liner may, however, be embodied in different forms and should not be construed as limited to the embodiments set forth herein. Rather, these embodiments are provided so that this disclosure will be thorough and complete, and will fully convey the scope of the transition cone liner to those skilled in the art.

Unless otherwise defined, all technical and scientific terms used herein have the same meaning as commonly understood by one of ordinary skill in the art to which the transition cone liner belongs. The terminology used in the description of the transition cone liner is for describing particular embodiments only and is not intended to be limiting of the transition cone liner. As used in the description of the transition cone liner and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the transition cone liner. Notwithstanding that the numerical ranges and parameters setting forth the broad scope of the transition cone liner are approximations, the numerical values set forth in the specific examples are reported as precisely as possible. Any numerical values, however, inherently contain certain errors necessarily resulting from error found in their respective measurements.

The description and figures disclose a transition cone liner for use in a farm combine. Generally, the transition cone liner is attached to an inner surface of a transition cone and configured to absorb abrasive forces caused by crop cuttings moving across the inner surface of the transition cone. The transition cone liner includes a plurality of discrete liner panels. The liner panels are configured to absorb the abrasive forces typically experienced by the inner surface of the transition cone. Advantageously, replacement of the liner panels is significantly easier and less labor intensive than replacement of the transition cone.

The term "farm combine", as used herein, is defined to mean any machine that harvests grain crops. The term "transition cone", as used herein, is defined to mean any structure configured to direct crop cuttings to a threshing rotor. The term "threshing rotor", as used herein, is defined to mean any structure configured to separate grain from chaff or straw.

Figure 1:
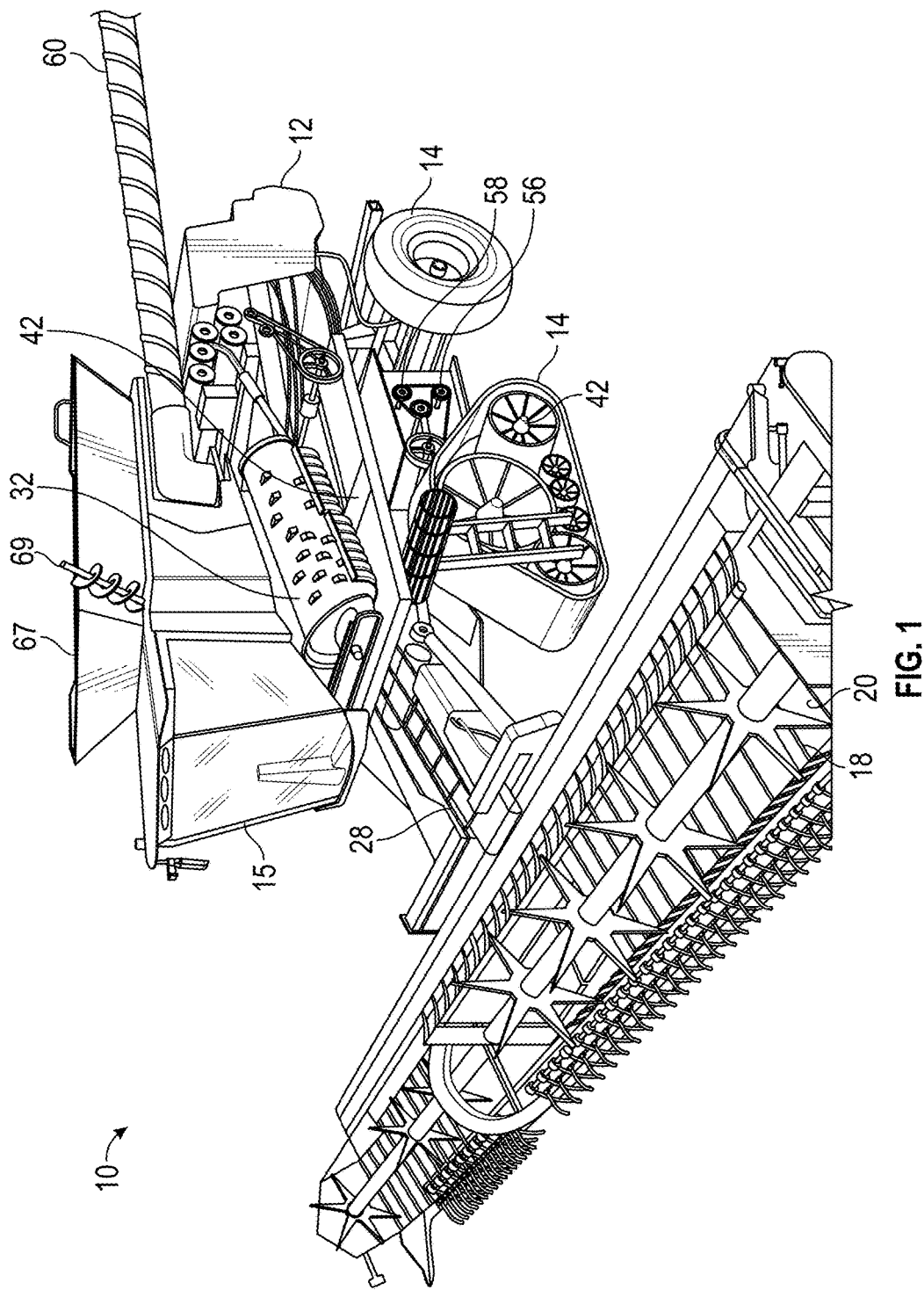
FIG. 1 is a perspective view, of a schematic illustration of a farm combine.

Referring now to FIG. 1, one non-limiting example of a farm combine (hereafter "combine") is illustrated generally at 10. The combine 10 is conventional in the art and will only be briefly described herein. The combine includes a support structure 12 equipped with ground engaging structures 14 extending from the supporting structure 12. The ground engaging structures 14 can include wheels, continuous tracks and the like. Operation of the combine 10 is controlled from an operator's cab 15. Grain crops (not shown) are gathered by a header 18, positioned at the front of the combine 10. The header 18 can include a pair of crop dividers positioned at either end. Generally speaking, the wider the header 18, the faster and more efficiently the combine 10 can cut a crop field. Different headers can be used for cutting different crops. In certain instances, the header 18 can be hydraulically powered, thereby allowing the operator to raise, lower, and angle the header 18 in different ways from the operator's cab 15. The header 18 can be removed and towed behind the combine 10 in a lengthwise orientation, such as it can fit down narrow lanes.

Referring again to FIG. 1, the header 18 includes a slowly rotating wheel 20 (commonly referred to as a reel or pickup reel). The reel 20 is configured to push the crops down toward a cutter bar (not shown). In certain embodiments, the reel 20 has horizontal bars called bats and vertical teeth or tines configured to grip the stalks of the crops. However, the reel can have other structures sufficient to push the crops down toward the cutter bar.

Referring again to FIG. 1, the cutter can extend across the length of the header 18 and can be positioned toward an underside of the reel 20. In the illustrated embodiment, the cutter bar includes a plurality of teeth (not shown), configured to open and close repeatedly, thereby cutting the crops at their base. In other embodiments, other cutting structures and methods can be used.

Referring again to FIG. 1, a transport assembly 28 is positioned downstream from the cutter bar. The transport assembly 28 is configured to feed crop cuttings toward a threshing assembly 32. In the illustrated embodiment, the transport assembly 28 is a conveyor. Alternatively, the transport assembly 28 can be any structure, mechanism or device sufficient to feed crop cuttings toward the threshing assembly 32.

Referring again to FIG. 1, the threshing assembly 32 is configured to separate the desired grain from the unwanted portions of the crop cuttings (commonly referred to as the chaff).

Figure 2:
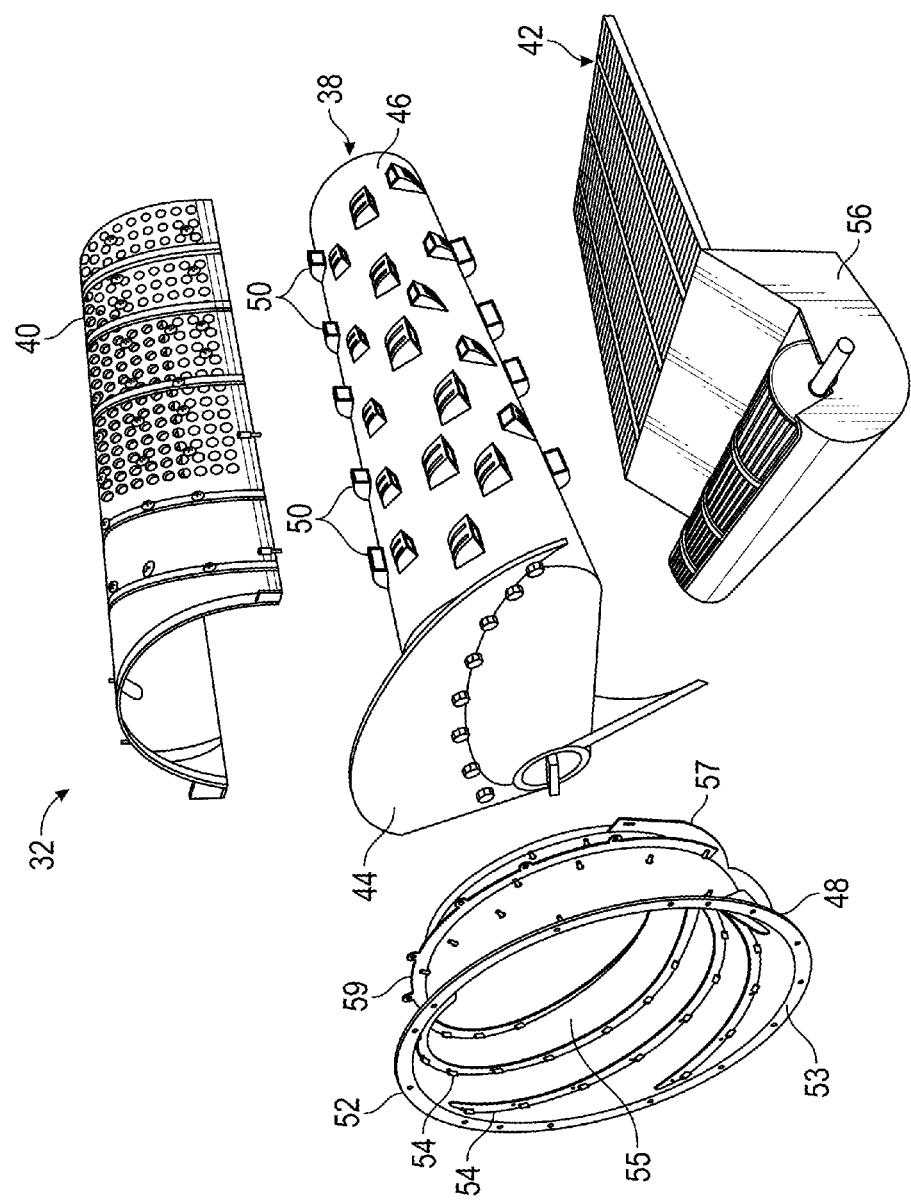
FIG. 2 is an exploded perspective view, of a threshing assembly of the farm combine of FIG. 1.

Referring now to FIG. 2, the threshing assembly 32 is shown in more detail. The threshing assembly 32 includes a rotor assembly 38 positioned intermediate a containment panel 40 and a sieve assembly 42. The rotor assembly 38 is configured for rotation and includes an auger 44 positioned upstream from a threshing rotor segment 46. The auger 44 is positioned within a transition cone 48 and is configured to advance the crop cuttings to the threshing rotor segment 46. The threshing rotor segment 46 includes a plurality of outwardly extending projections 50 configured to engage the crop cuttings, such as to break and shake the grain from the chaff.

Referring again to FIG. 2, the rotation of the auger 44 urges the crop cuttings against an inner surface 52 of the transition cone 48. The crop cuttings are guided by a plurality of vanes 54, attached to the inner surface 52 of the transition cone 48, in a downstream direction toward the threshing rotor segment 46. The transition cone 48 is a funnel shaped structure configured to receive the crop cuttings at an outer opening 53 and convey the crop cuttings through an interior passage 55 extending from the outer opening 53 to an inner opening 57. The transition cone 48 is formed with a circumferential sidewall 59. The transition cone 48 can be formed with any desired quantity of arcuate segments forming the circumferential sidewall 59.

Referring again to FIGS. 1 and 2, in operation, the projections 50 on the threshing rotor segment 46 engage the crop cuttings, thereby breaking the grain from the chaff. The grain, now free from the chaff, falls through the sieve assembly 42 and lands in a fan housing 56 below. The chaff is moved by one or more conveyors, shown schematically at 58 in a direction toward the back of the combine 10. In certain embodiments, as the conveyors 58 move the chaff toward the back of the combine 10, more grain can fall through the conveyor 58 and into the fan housing 56.

Referring again to FIG. 1, the grain in the fan housing 56 is conveyed to a collecting tank 67 by a conveyance assembly 69. In the illustrated embodiment, the conveyance assembly 69 is an auger-based structure. Alternatively, the conveyance assembly 69 can be any structure, mechanism or device sufficient to feed grain to the collecting tank 67 from the fan housing 56.

Referring again to FIG. 1, when the collecting tank 67 is full of grain, the grain is transported from the collecting tank 67 to an outlet port 60. Upon exiting the outlet port 60, the grain can be loaded onto transportation devices, such as the non-limiting example of a tractor with one or more trailers. In certain embodiments, the grain can be transported from the collecting tank 67 to the outlet port 60 by mechanisms and structures such as an elevator and a side pipe (sometimes referred to as the unloader). However, other mechanisms and structures sufficient to transport the grain from the collecting tank 67 to the outlet port 60 can be used.

Referring again to FIG. 1 in a final operational step, chaff is conveyed to the rear of the combine 10 and dispersed from the combine 10. In certain embodiments, the combine can have a rotating spreader mechanism configured to spread the chaff over a wide area. In other embodiments, the chaff can be baled by a baling machine and used for other farming purposes.

Figure 3:
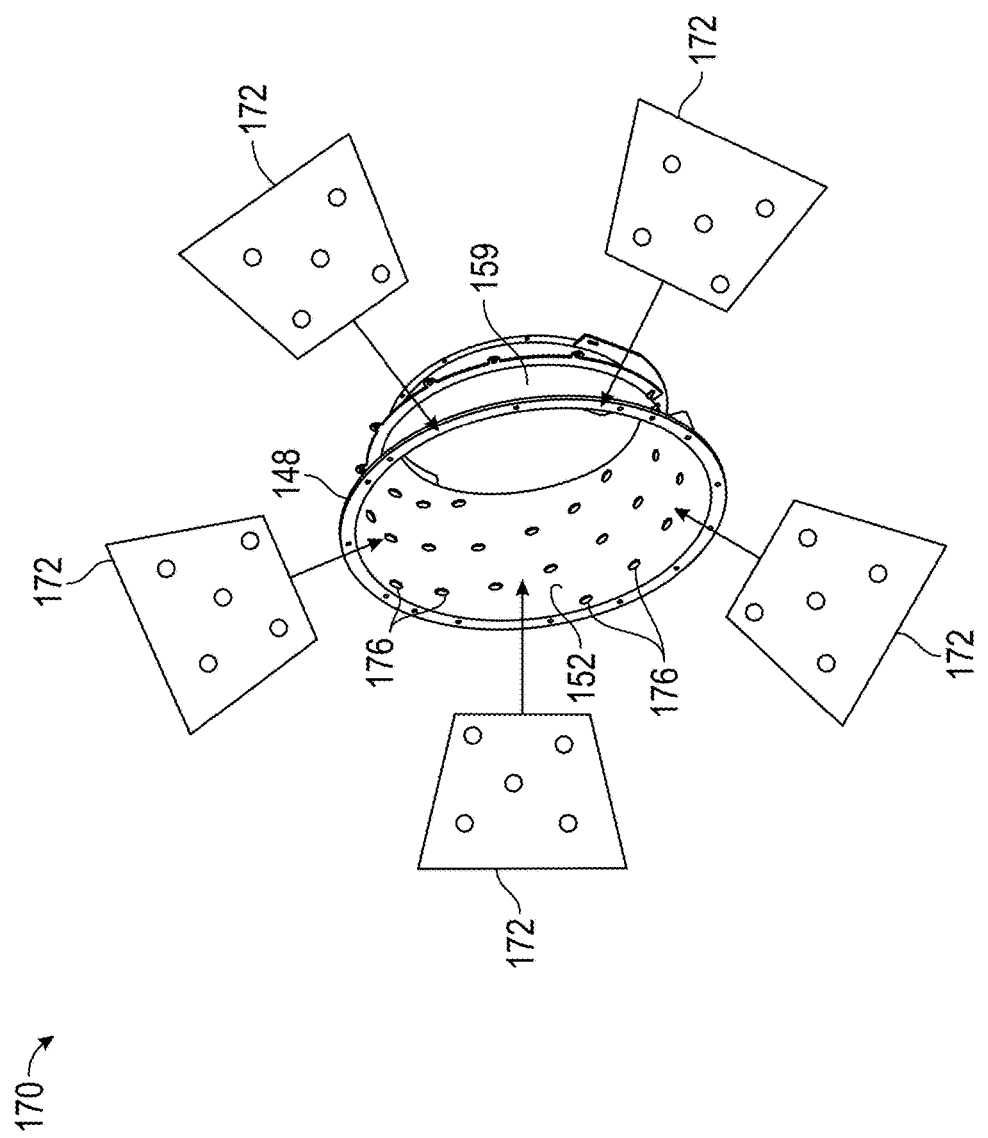
FIG. 3 is an exploded perspective view of an improved transition cone of the farm combine of FIG. 1, illustrating a plurality of transition cone liners.
Figure 4:
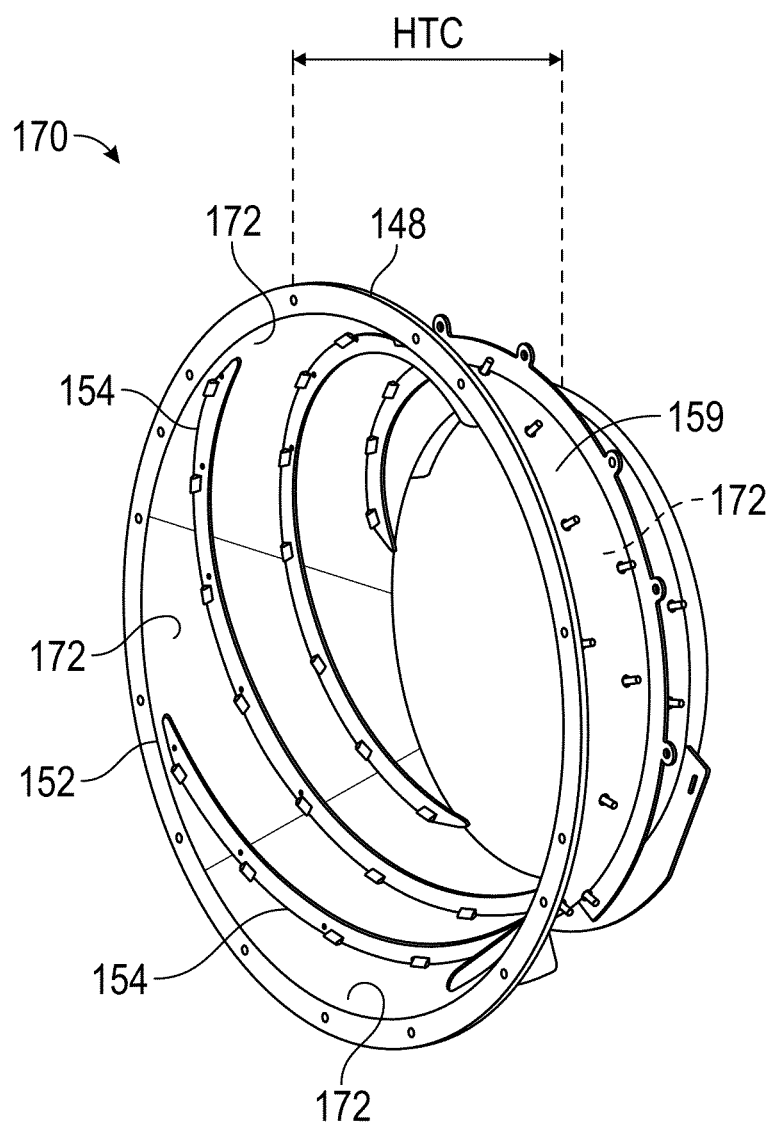
FIG. 4 is a perspective view of the improved transition cone of FIG. 3, shown in an assembled orientation.

Referring now to FIGS. 3 and 4, an improved transition cone assembly is shown generally at 170. FIG. 3 illustrated the improved transition cone assembly 170 in an exploded view and FIG. 4 illustrates the improved transition cone assembly in an assembled orientation. The improved transition cone assembly 170 includes a transition cone 148 fitted with a plurality of discrete liner panels 172. The liner panels 172 are attached to an inner surface 152 of a transition cone 148 and configured to absorb abrasive forces caused by crop cuttings moving across the inner surface 152 of the transition cone 148. In the illustrated embodiment, the transition cone 148 is the same as, or similar to, the transition cone 48 described above and shown in FIG. 2. However, in other embodiments, the transition cone 148 can be different from the transition cone 48. Referring now to FIG. 4, a plurality of vanes 154 are fitted over the liner panels 172 and attached to the transition cone 148 (the vanes 154 are omitted from FIG. 3 for purposes of clarity). In the illustrated embodiment, the vanes 154 are the same as, or similar to, the vanes 54 described above and shown in FIG. 2. In other embodiments, the vanes 154 can be different from the vanes 54.

Figure 5:
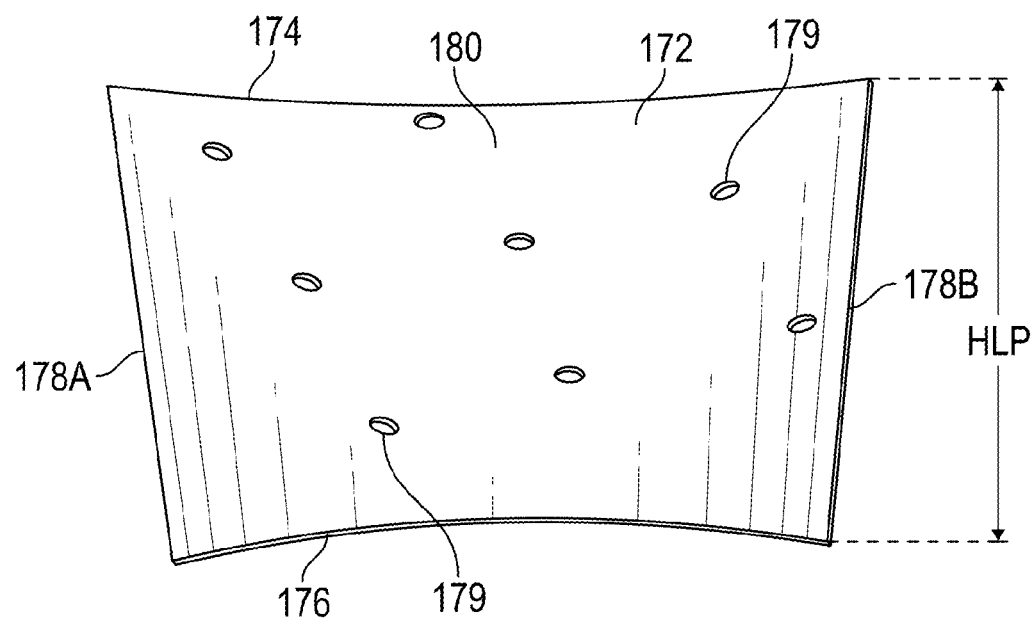
FIG. 5 is a front view, in elevation, of a liner panel forming a portion of the improved transition cone of FIG. 4.
Figure 6:
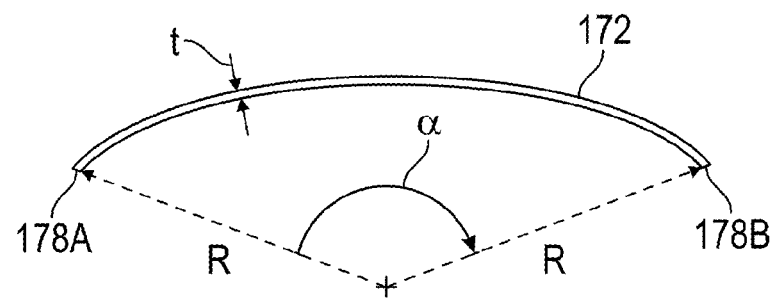
FIG. 6 is a plan view, in elevation, of the liner panel of FIG. 5.

Referring now to FIGS. 5 and 6, a representative liner panel 172 is illustrated. The liner panel 172 has an upper edge 174, a lower edge 176 and opposing side edges 178A, 178B. In the illustrated embodiment, the upper edge 174 is longer than the lower edge 176. Accordingly, the edges 174, 176, 178A and 178B cooperate such that the liner panel forms a tapered shape. As shown in FIG. 4, the liner panels 172 are configured to seat with adjacent liner panels 172 in a side edge-to-side edge orientation against an inner surface of the transition cone 148. Accordingly, the amount of the taper of an individual liner panel 172 is a function of the depth of the transition cone 148.

Referring now to FIGS. 4 and 6, the liner panel 172 has an arcuate cross-sectional shape, configured to align with an inner surface 152 of the funnel-shaped circumferential sidewall 159. The opposing side edges 178A, 178B form an angle α with a radius R of the arcuate liner panel 172. In the illustrated embodiment, the angle α is approximately 72°, resulting in a quantity of five liner panels 172 to cover the entirety of the inner surface 152 of the transition cone 148. In other embodiments, the angle α of the liner panels can be more or less than approximately 72° and the resulting quantity of liner panels 172 can be more or less than five, sufficient that the entirety of the inner surface 152 of the transition cone 148 is covered by liner panels.

Referring again to FIGS. 4 and 6, the liner panel 172 has a height HLP. The height HLP of the liner panel 172 corresponds to a height HTC of the transition cone 148, such that the entirety of the inner surface 152 of the transition cone 148 is covered by liner panels 172. In the illustrated embodiment, the height HLP is in a range of from about 10.0 inches to about 20.0 inches. Alternatively, the height HLP of the liner panel 172 can be less than about 10.0 inches or more than about 20.0 inches, sufficient that the entirety of the inner surface 152 of the transition cone 148 is covered by liner panels 172.

Referring again to FIG. 3, the transition cone 148 has a plurality of apertures 176 extending through the circumferential sidewall 159. The apertures 176 are configured to receive fasteners (not shown) for attaching the vanes 154. The apertures 176 can be arranged in a repeating pattern. In the illustrated embodiment, the apertures 176 are arranged in a spiral pattern, configured to align with a pattern of apertures in the vanes 154 such that fasteners can extend through the vanes 154 and through the transition cone 148. Referring again to FIG. 5, the liner panel 172 includes a plurality of apertures 179, configured to align with a pattern of apertures in the vanes 154 and the apertures 176 in the circumferential sidewall 159 of the transition cone 148. Such alignment of the apertures 176, 179 advantageously allows reuse of the vanes 154 and the fasteners attaching the vanes 154 and the liner panels 172 to the transition cone 148.

Referring now to FIG. 6, the liner panel 172 has a thickness t. The thickness t of the liner panel 172 is configured to absorb abrasive forces caused by crop cuttings moving across the inner surface 152 of the transition cone 148 and further configured to allow alignment of the apertures 179 in the liner panel 172 with the apertures in the transition cone 148. In the illustrated embodiment, the thickness t is in a range of from about 0.10 inches to about 0.18 inches. However, in other embodiments, the thickness t can be less than about 0.10 inches or more than about 0.18 inches, sufficient to absorb abrasive forces caused by crop cuttings moving across the inner surface 152 of the transition cone 148 and also sufficient to allow alignment of the apertures 179 in the liner panel 172 with the apertures in the transition cone 148.

Referring again to FIG. 6, in certain instances the abrasive forces caused by crop cuttings moving across the inner surface 152 of the transition cone 148 can be severe. Accordingly, it is desirable that the liner panel 172 be formed of a material having a sufficient surface hardness to substantially absorb the abrasive forces and avoid frequent replacement of the liner panels 172. In the illustrated embodiment, the liner panel 172 is formed from AR400 abrasion resistant steel plate having a Brinell hardness rating of 400 HB. In other embodiments, the liner panel 172 can be formed from other materials or combinations of materials sufficient to absorb the abrasive forces and avoid frequent replacement of the liner panel 172.

Referring again to FIG. 5, in certain embodiments an inner surface 180 of the liner panel 172 can be coated with one or more materials configured to provide additional abrasion resistance. One non-limiting example of a coating material is a spray-on carbide coating.

As described above, a plurality of liner panels are attached to an inner surface of a transition cone and configured to absorb abrasive forces caused by crop cuttings moving across the inner surface of the transition cone. As the crop cuttings move across the stationary transition cone and the panel liners, the crop cuttings abrade the exposed surface of the panel liners. Since the panel liners are without leading edges configured to grab and/or dig into the crop cuttings, the abrasion of the liner panels occurs on the inner surfaces of the liner panels. It should be apparent that without the liner panels, the transition cone can be sufficiently abraded such that failures in the form of holes can be formed in the transition cone. In certain instances, the holes in the transition cone can become sufficiently prominent as to allow portions of the crop cuttings to pass through.

The principle and mode of operation of the transition cone liner has been described in certain embodiments. However, it should be noted that the transition cone liner may be practiced otherwise than as specifically illustrated and described without departing from its scope.

What is claimed is:

1. A transition cone liner panel for use within the interior of a transition cone of a rotor assembly of a farm combine, the transition cone having a funnel shaped circumferential sidewall with an inner surface, the transition cone liner panel absorbent of abrasive forces caused by crop cuttings moving across the inner surface of the transition cone, the transition cone liner panel comprising:
   an upper edge having a length;
   a lower edge arranged opposite the upper edge, the lower edge having a length that is shorter than the length of the upper edge;
   opposing side edges connecting the upper edge to the lower edge, the opposing side edges, upper edge and lower edge cooperating such that the transition cone liner panel has a tapered and arcuate shape, the arcuate shape forming an angle of about 72° between the opposing side edges;
   an inner surface receiving and seating a plurality of vanes, the plurality of vanes guiding the crop cuttings in a downstream direction; and an outer surface attached to the funnel shaped circumferential inner surface of the transition cone.

2. The transition cone liner panel of claim 1, wherein the transition cone liner panel has a side edge-to-side edge orientation with an adjacent transition cone liner panel.

3. The transition cone liner panel of claim 1, wherein the transition cone liner panel includes a plurality of apertures that align with corresponding apertures in the transition cone.

4. The transition cone liner panel of claim 3, wherein the plurality of apertures in the transition cone liner panel have a spiral pattern.

5. The transition cone liner panel of claim 1, wherein the transition cone liner panel is formed from AR400 abrasion resistant steel plate.

6. The transition cone liner panel of claim 1, wherein an exposed surface of the transition cone liner panel is coated with an abrasion resistant coating.

7. The transition cone liner panel of claim 1, wherein the transition cone liner panel has a height from 10.0 inches to 20.0 inches.

8. The transition cone liner panel of claim 1, wherein the transition cone liner panel has a thickness from 0.10 inches to 0.18 inches.

9. The transition cone liner panel of claim 1, wherein the transition cone liner panel has a surface hardness of about 400 HB.

10. The transition cone liner panel of claim 1, wherein the transition cone liner panel cooperates with other transition cone liner panels to cover the entirety of the inner surface of the transition cone.

11. The transition cone liner panel of claim 10, wherein a quantity of at least five transition cone liner panels are seated against the inner surface of the circumferential sidewall of the transition cone.

* * * * *